(12) United States Patent
Lee et al.

(10) Patent No.: US 7,391,571 B2
(45) Date of Patent: Jun. 24, 2008

(54) DIFFUSION PLATE USED IN DIRECT-TYPE BACKLIGHT MODULE

(75) Inventors: Mao-Song Lee, Hsinchu (TW);
Hsi-Hsin Shih, Taichung (TW);
Shen-Yin Tsai, Tainan (TW);
Tien-Chieh Chang, Tainan (TW);
Chin-Lung Kuo, Tainan (TW);
Jun-Hong Lin, Jiali Township, Tainan County (TW); Shih-Kai Cheng, Yilan (TW)

(73) Assignee: Chi Lin Technology Co., Ltd., Rende Township (TW)

( * ) Notice: Subject to any disclaimer, the term of this patent is extended or adjusted under 35 U.S.C. 154(b) by 184 days.

(21) Appl. No.: 11/182,095

(22) Filed: Jul. 15, 2005

(65) Prior Publication Data

US 2007/0014034 A1    Jan. 18, 2007

(51) Int. Cl.
*G02B 5/02*    (2006.01)
*G02B 27/10*   (2006.01)
*F21S 4/00*    (2006.01)
*F21V 13/00*   (2006.01)
*F21V 5/00*    (2006.01)
*F21V 5/04*    (2006.01)
*G09F 13/04*   (2006.01)

(52) U.S. Cl. .................. 359/619; 359/599; 359/620; 362/223; 362/225; 362/242; 362/246; 362/335; 362/97

(58) Field of Classification Search ................. 359/707, 359/599, 619, 620, 625; 362/223, 225, 242, 362/246, 335, 97, 33, 359, 812
See application file for complete search history.

(56) References Cited

U.S. PATENT DOCUMENTS

| | | | |
|---|---|---|---|
| 5,956,107 A | 9/1999 | Hashimoto et al. | |
| 7,213,936 B2 * | 5/2007 | Wang et al. | 362/223 |

FOREIGN PATENT DOCUMENTS

| | | |
|---|---|---|
| JP | 2-120702 | 5/1990 |
| JP | 3-203771 | 9/1991 |
| JP | 2003-123736 | 4/2003 |
| JP | 2003-215585 | 7/2003 |
| JP | 2003-297120 | 10/2003 |
| JP | 2004-29091 | 1/2004 |
| JP | 2004-240392 | 8/2004 |
| JP | 2004-272189 | 9/2004 |

OTHER PUBLICATIONS esp@cenet Abstract of JP2004240392 of Aug. 26, 2004.

(Continued)

*Primary Examiner*—Loha Ben
*Assistant Examiner*—Jack Dinh
(74) *Attorney, Agent, or Firm*—Ladas & Parry LLP

(57) ABSTRACT

The present invention relates to a diffusion plate used in a direct-type backlight module and a method for making the same. At least one of the surfaces of the diffusion plate has a microstructure constituted by repeated undulation that can refract and diffuse the incident light beams that enter the diffusion plate. Therefore, the paths of the light beams after entering the diffusion plate are changed, which raises the luminance of the backlight module.

5 Claims, 6 Drawing Sheets

OTHER PUBLICATIONS esp@cenet Abstract of JP2004272189 of Sep. 30, 2004.
esp@cenet Abstract of JP2004029091 of Jan. 29, 2004.
esp@cenet Abstract of JP2003297120 of Oct. 17, 2003.
Patent Abstracts of Japan Abstract of JP03-203771 of Sep. 5, 1991.
Patent Abstracts of Japan of JP 2003-215585 of Jul. 30, 2003.
Patent Abstracts of Japan of JP 02-120702 of May 8, 1990.
English Abstract of WO 2004/097466 of Nov. 11, 2004.

* cited by examiner

DIFFUSION PLATE USED IN DIRECT-TYPE BACKLIGHT MODULE

BACKGROUND OF THE INVENTION

1. Field of the Invention

The present invention relates to a diffusion plate used in a direct-type backlight module and a method for making the same, particularly to a diffusion plate having a microstructure on the illuminated surface thereof and a method for making the same.

2. Description of the Related Art

FIG. 1 shows a schematic view of a conventional direct-type backlight module. The direct-type backlight module 1 is used in a liquid crystal display and comprises a diffusion plate 10, a plurality of lamps 12, a reflector 14, a diffusion film 16, a brightness enhancement film (BEF) 18 and a plurality of diffusion particles 19.

The diffusion plate 10 is a transparent body doped with the diffusion particles 19 therein or thereon. The refractive index of the diffusion particles 19 is different from that of the body of the diffusion plate 10. The light beams in the diffusion plate 10 are diffused due to the refraction of the diffusion particles 19 so that the lamp mura between the lamps 12 can be reduced. The diffusion plate 10 has a top surface 101 and a bottom surface 102, wherein the bottom surface 102 is an illuminated surface for receiving the incident light beams emitted from the lamps 12 directly and the incident light beams reflected by the reflector 14. The top surface 101 of the diffusion plate 10 is attached with the diffusion film 16 and the brightness enhancement film 18. The brightness enhancement film 18 has a plurality of prisms thereon so as to concentrate the diffused light beams within the desired view angle of the liquid crystal display and raise the luminance in the desired view angle of the backlight module 1.

The shortcoming of the diffusion plate 10 is that it only can diffuse the light beams. If the paths of the light beams need to be changed (e.g., concentrated after diffusion), this necessitates other optical films (e.g., the diffusion film 16, and the brightness enhancement film 18). However, the optical defects easily occur on the optical films due to the environmental affect so that the yield of the backlight module 1 is lowered. Additionally, the optical films are expensive, which raises the cost of the backlight module 1. Further, each optical film only has a single optical function, which limits the optical design, and cannot be adapted for various customized designs.

Consequently, there is an existing need for a novel and improved diffusion plate and the method for making the same to solve the above-mentioned problem.

SUMMARY OF THE INVENTION

One objective of the present invention is to provide a diffusion plate used in a direct-type backlight module. At least one of the surfaces of the diffusion plate has a microstructure constituted by repeated undulation that can refract and diffuse the incident light beams that enter the diffusion plate. Therefore, the paths of the light beams after entering the diffusion plate are changed, which raises the luminance of the backlight module.

Another objective of the present invention is to provide a method for making a diffusion plate used in a direct-type backlight module. The method utilizes a corolling process to make a diffusion plate with composite structure and form a microstructure on the surface of the diffusion plate. Therefore, the paths of the light beams after entering the diffusion plate are changed, which raises the luminance of the backlight module.

Yet another objective of the present invention is to provide a method for making a diffusion plate used in a direct-type backlight module. The method utilizes rolling wheels to roll a material to form a diffusion plate with composite structure and form a microstructure on the surface of the diffusion plate. Therefore, the paths of the light beams after entering the diffusion plate are changed, which raises the luminance of the backlight module.

Still another objective of the present invention is to provide a diffusion plate used in a direct-type backlight module. The diffusion plate itself has the functions of conventional optical films, which can reduce the variable factors of parts and raise the reliability of the backlight module. Further, the cost of the backlight module is reduced due to the omission of the expensive conventional optical films.

DETAILED DESCRIPTION OF THE INVENTION

Figure 1:
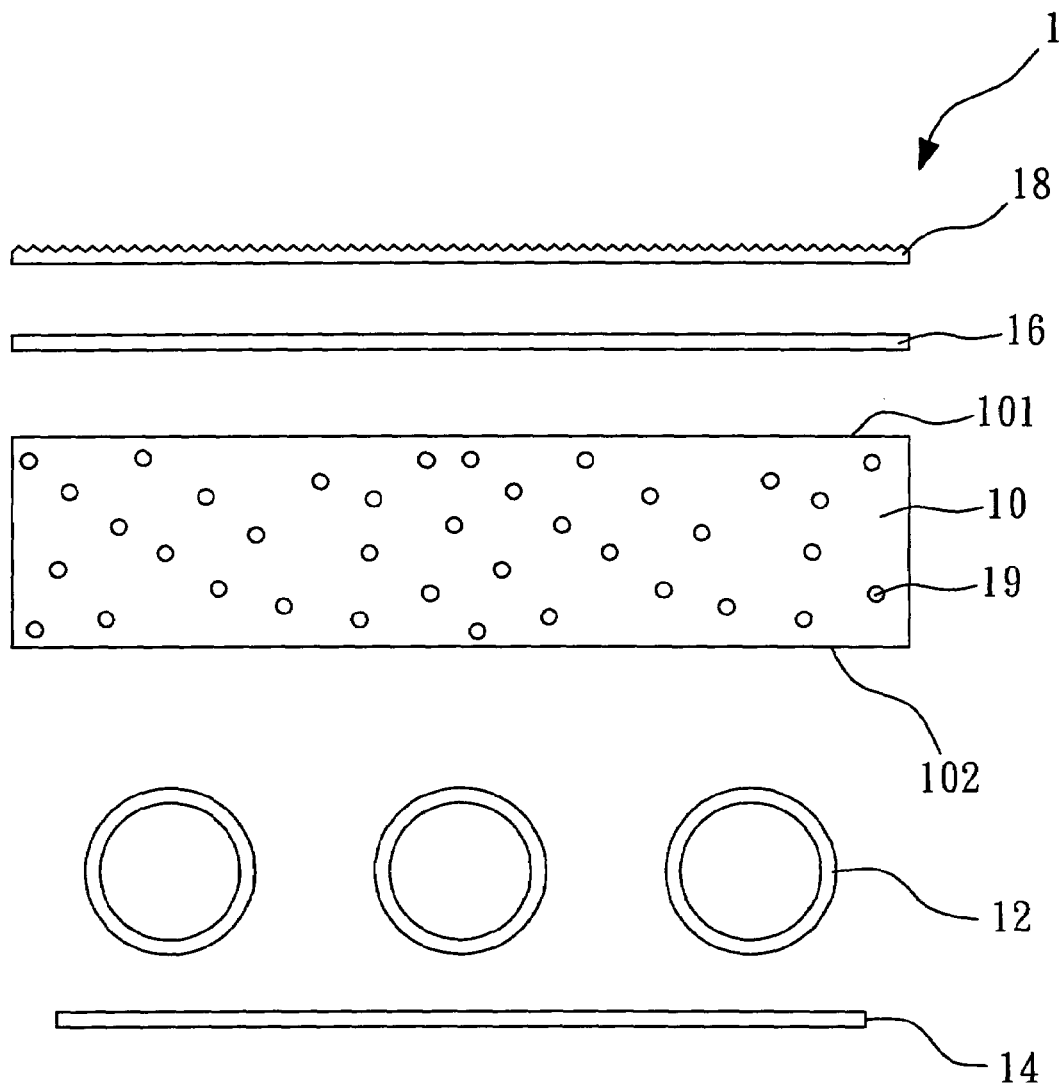
FIG. 1 shows a schematic view of a conventional direct-type backlight module.
Figure 2:
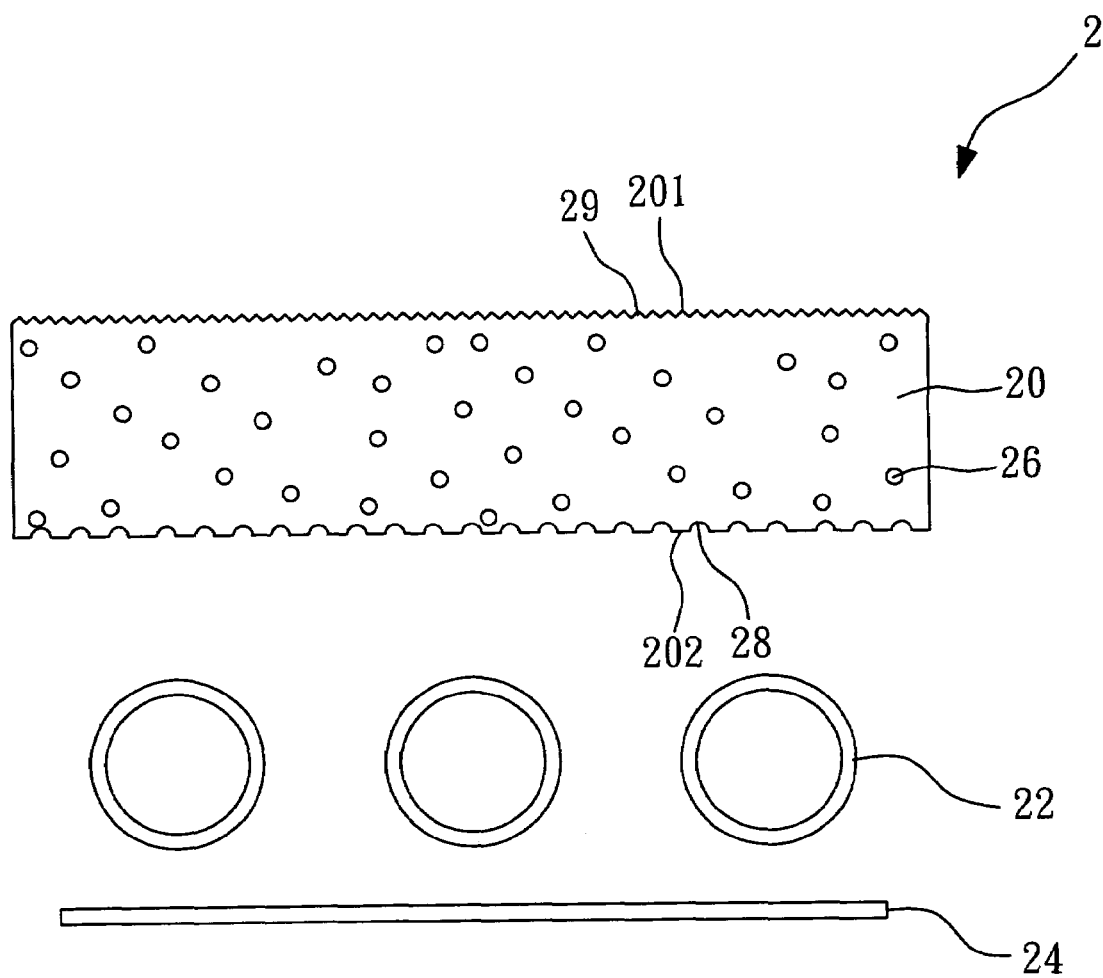
FIG. 2 shows a schematic view of a direct-type backlight module according to a first embodiment of the present invention.

FIG. 2 shows a schematic view of a direct-type backlight module according to a first embodiment of the present invention. The direct-type backlight module 2 is used in a display device and comprises a diffusion plate 20, a plurality of lamps 22, a reflector 24, and a plurality of diffusion particles 26.

The diffusion plate 20 is a transparent body doped with the diffusion particles 26 therein. The second refractive index $n_2$ of the diffusion particles 26 is different from the first refractive index $n_1$ of the body of the diffusion plate 20. The light beams in the diffusion plate 20 are diffused due to the refraction of the diffusion particles 26 so that the lamp mura between the lamps 22 can be reduced. The diffusion plate 20 has a top surface 201 and a bottom surface 202.

The bottom surface 202 of the diffusion plate 20 is an illuminated surface for receiving the incident light beams emitted from the lamps 22 directly and the incident light beams reflected by the reflector 24. In the embodiment, the diffusion plate 20 has a first microstructure 28 on the bottom surface 202 thereof. The first microstructure 28 is constituted by repeated undulation that can refract and diffuse the incident light beams that enter the diffusion plate 20. Therefore, the paths of the light beams after entering the diffusion plate 20 are changed, which raises the luminance of the backlight module 2. The appearance of the first microstructure 28 includes but is not limited to plural parallel or cross grooves and extrusions. The shape of the grooves or extrusions is selected from circular, rectangular, trapezoidal and triangular shapes.

The top surface 201 of the diffusion plate 20 is an output surface for transmitting the light beams out of the diffusion plate 20. In the embodiment, the diffusion plate 20 has a second microstructure 29 on the top surface 201 thereof. The second microstructure 29 is constituted by repeated undulation that can concentrate the light beams diffused by the diffusion plate 20 and then transmit them. The appearance of the second microstructure 29 includes but is not limited to plural parallel or cross grooves and extrusions. The shape of the grooves or extrusions is circular, rectangular, trapezoidal, triangular or another shape.

Figure 3:
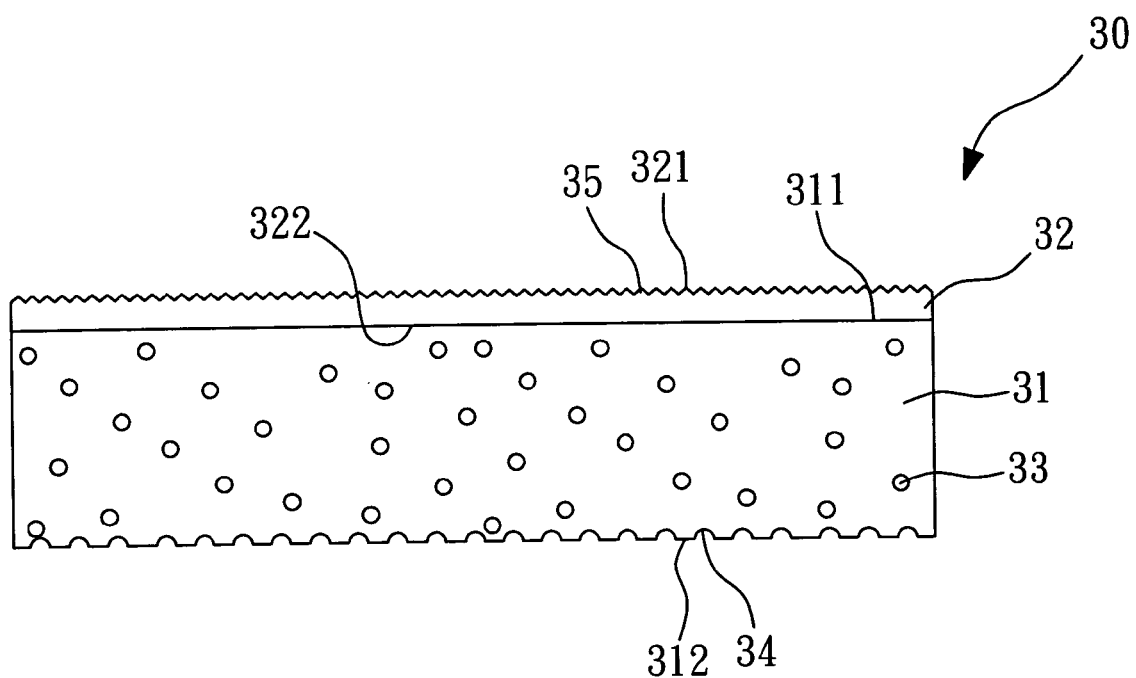
FIG. 3 shows a schematic view of a diffusion plate according to a second embodiment of the present invention.

FIG. 3 shows a schematic view of a diffusion plate according to a second embodiment of the present invention. The diffusion plate 30 of the embodiment is used in a direct-type backlight module and comprises a body 31, an upper layer 32 and a plurality of diffusion particles 33. The body 31 has a top surface 311 and a bottom surface 312. The body 31 has a first refractive index $n_1$. The diffusion particles 33 are doped in the body 31 and have a second refractive index $n_2$. The light beams in the body 31 are diffused due to the refraction of the diffusion particles 33. The upper layer 32 is a transparent material and has a top surface 321 and a bottom surface 322. The upper layer 32 has a fourth refractive index $n_4$. In the embodiment, the first refractive index $n_1$ is different from the second refractive index $n_2$, and the first refractive index $n_1$ is larger than the fourth refractive index $n_4$.

The bottom surface 312 of the body 31 is an illuminated surface for receiving the incident light beams. In the embodiment, the body 31 has a first microstructure 34 on the bottom surface 312 thereof. The first microstructure 34 is constituted by repeated undulation that can refract and diffuse the incident light beams that enter the body 31. Therefore, the paths of the light beams after entering the diffusion plate 30 are changed, which raises the luminance of the backlight module. The appearance of the first microstructure 34 includes but is not limited to plural parallel or cross grooves and extrusions. The shape of the grooves or extrusions is circular, rectangular, trapezoidal, triangular or another shape.

The bottom surface 322 of the upper layer 32 is disposed on the top surface 311 of the body 31. The top surface 321 of the upper layer 32 is an output surface for transmitting the light beams out of the diffusion plate 30. In the embodiment, the upper layer 32 has a second microstructure 35 on the top surface 321 thereof. The second microstructure 35 is constituted by repeated undulation that can concentrate the light beams diffused by the diffusion plate 30 and then transmit them. The appearance of the second microstructure 35 includes but is not limited to plural parallel or cross grooves and extrusions. The shape of the grooves or extrusions is circular, rectangular, trapezoidal, triangular or another shape.

Figure 4:
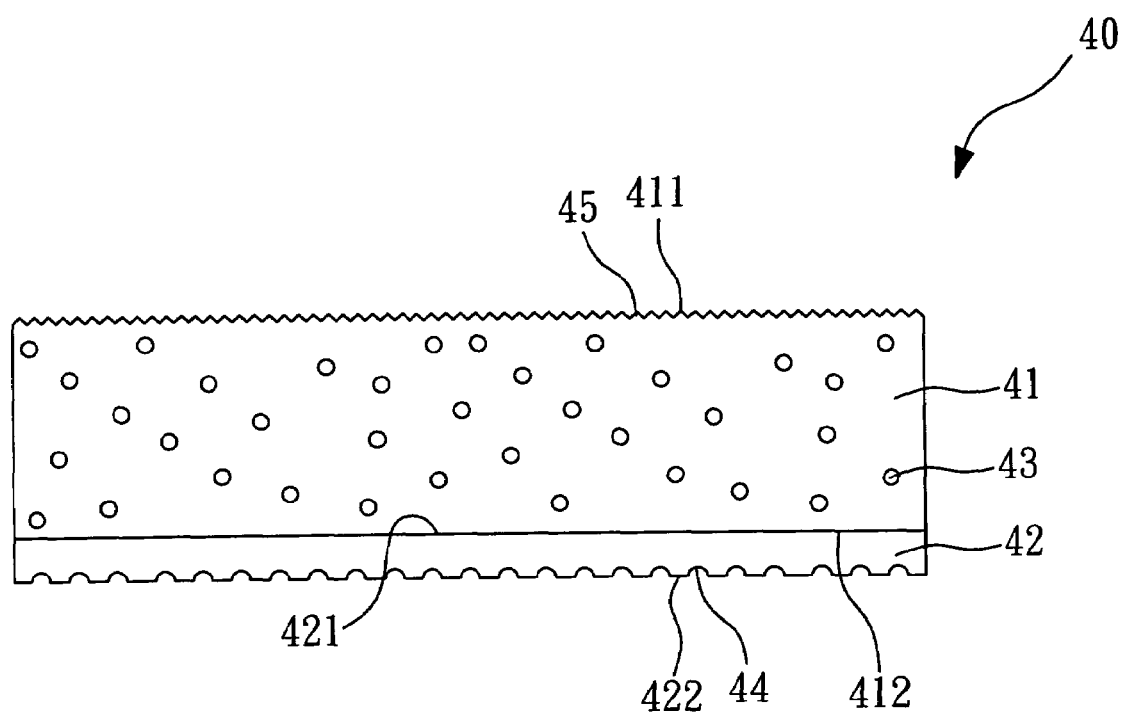
FIG. 4 shows a schematic view of a diffusion plate according to a third embodiment of the present invention.

FIG. 4 shows a schematic view of a diffusion plate according to a third embodiment of the present invention. The diffusion plate 40 of the embodiment comprises a body 41, a lower layer 42 and a plurality of diffusion particles 43. The body 41 has a top surface 411 and a bottom surface 412. The body 41 has a first refractive index $n_1$. The diffusion particles 43 are doped in the body 41 and have a second refractive index $n_2$. The light beams in the body 41 are diffused due to the refraction of the diffusion particles 43. The lower layer 42 is a transparent material and has a top surface 421 and a bottom surface 422. The lower layer 42 has a third refractive index $n_3$. In the embodiment, the first refractive index $n_1$ is different from the second refractive index $n_2$, and the first refractive index $n_1$ is larger than the third refractive index $n_3$.

The top surface 421 of the lower layer 42 is attached to the bottom surface 412 of the body 41. The bottom surface 422 of the lower layer 42 is an illuminated surface for receiving the incident light beams. In the embodiment, the lower layer 42 has a first microstructure 44 on the bottom surface 422 thereof. The first microstructure 44 is constituted by repeated undulation that can refract and diffuse the incident light beams that enter the diffusion plate 40. Therefore, the paths of the light beams after entering the diffusion plate 40 are changed, which raises the luminance of the backlight module. The appearance of the first microstructure 44 includes but is not limited to plural parallel or cross grooves and extrusions. The shape of the grooves or extrusions is circular, rectangular, trapezoidal, triangular or another shape.

The top surface 411 of the body 41 is an output surface for transmitting the light beams out of the diffusion plate 40. In the embodiment, the body 41 has a second microstructure 45 on the top surface 411 thereof. The second microstructure 45 is constituted by repeated undulation that can concentrate the light beams diffused by the diffusion plate 40 and then transmit them. The appearance of the second microstructure 45 includes but is not limited to plural parallel or cross grooves and extrusions. The shape of the grooves or extrusions is circular, rectangular, trapezoidal, triangular or another shape.

Figure 5:
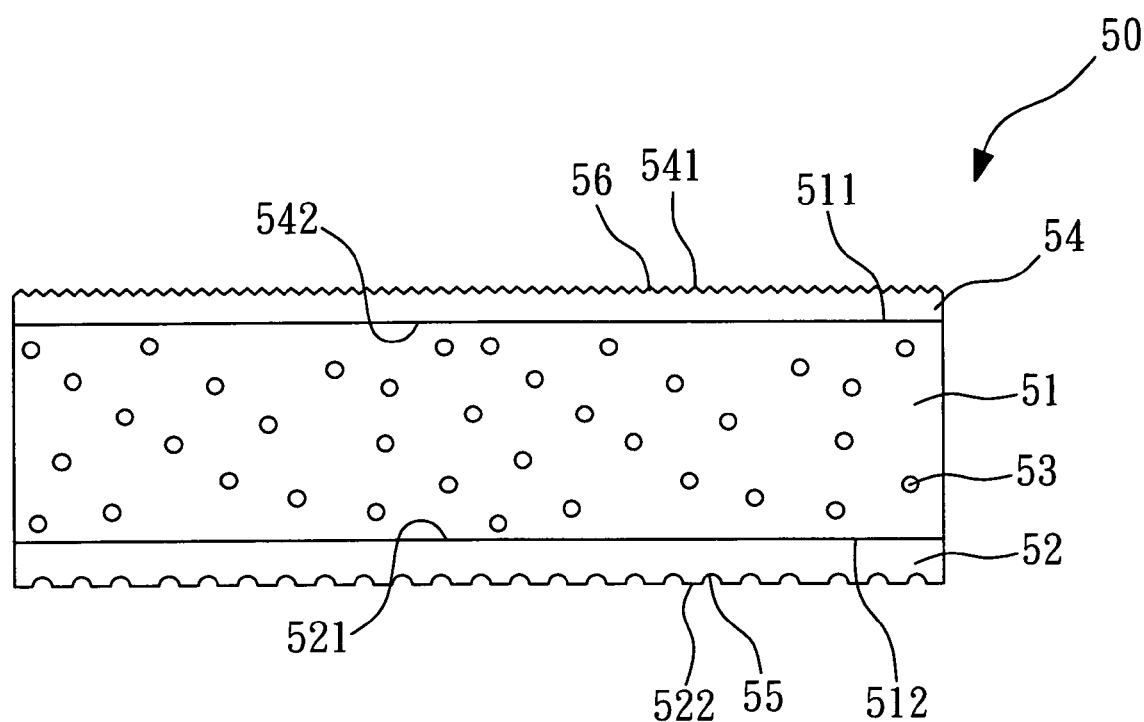
FIG. 5 shows a schematic view of a diffusion plate according to a fourth embodiment of the present invention.

FIG. 5 shows a schematic view of a diffusion plate according to a fourth embodiment of the present invention. The diffusion plate 50 of the embodiment comprises a body 51, a lower layer 52, a plurality of diffusion particles 53 and an upper layer 54. The body 51 has a top surface 511 and a bottom surface 512. The body 51 has a first refractive index $n_1$. The diffusion particles 53 are doped in the body 51 and have a second refractive index $n_2$. The light beams in the body 51 are diffused due to the refraction of the diffusion particles 53. The lower layer 52 is a transparent material and has a top surface 521 and a bottom surface 522. The lower layer 52 has a third refractive index $n_3$. The upper layer 54 is a transparent material and has a top surface 541 and a bottom surface 542. The upper layer 54 has a fourth refractive index $n_4$. In the embodiment, the first refractive index $n_1$ is different from the second refractive index $n_2$, the first refractive index $n_1$ is larger than the third refractive index $n_3$, and the first refractive index $n_1$ is larger than the fourth refractive index $n_4$.

The top surface 521 of the lower layer 52 is attached to the bottom surface 512 of the body 51. The bottom surface 522 of the lower layer 52 is an illuminated surface for receiving the incident light beams. In the embodiment, the lower layer 52 has a first microstructure 55 on the bottom surface 522 thereof. The first microstructure 55 is constituted by repeated undulation that can refract and diffuse the incident light beams that enter the diffusion plate 50. Therefore, the paths of the light beams after entering the diffusion plate 50 are changed, which raises the luminance of the backlight module. The appearance of the first microstructure 55 includes but is not limited to plural parallel or cross grooves and extrusions. The shape of the grooves or extrusions is circular, rectangular, trapezoidal, triangular or another shape.

The bottom surface 542 of the upper layer 54 is attached to the top surface 511 of the body 51. The top surface 541 of the upper layer 54 is an output surface for transmitting the light beams out of the diffusion plate 50. In the embodiment, the upper layer 54 has a second microstructure 56 on the top surface 541 thereof. The second microstructure 56 is constituted by repeated undulation that can concentrate the light beams diffused by the diffusion plate 50 and then transmit them. The appearance of the second microstructure 56 includes but is not limited to plural parallel or cross grooves and extrusions. The shape of the grooves or extrusions is circular, rectangular, trapezoidal, triangular or another shape.

Figure 6:
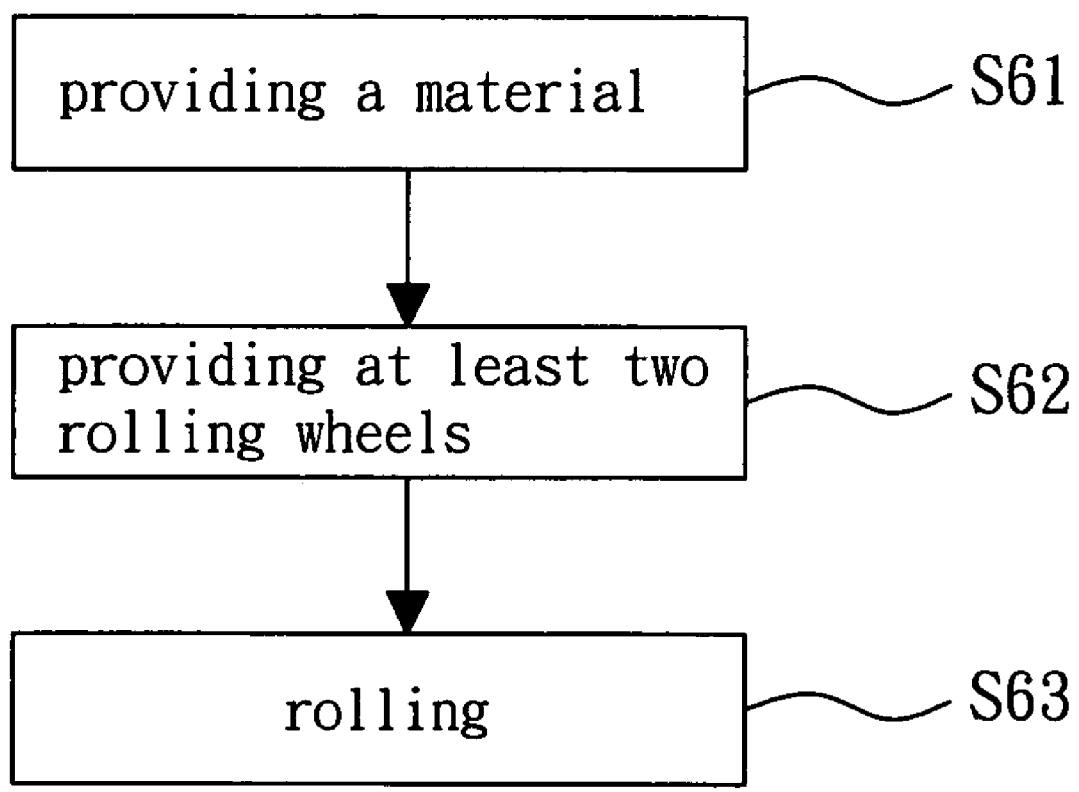
FIG. 6 shows a flow diagram for making a diffusion plate used in a direct-type backlight module according to the present invention.

FIG. 6 shows a flow diagram for making a diffusion plate used in a direct-type backlight module according to the present invention. First, step S61 is to provide a material. Then, step S62 is to provide at least two rolling wheels, wherein at least one of the rolling wheels has repeated undulation on the surface thereof. Finally, step S63 is to utilize the rolling wheels to roll the material to form a diffusion plate, wherein the diffusion plate has a top surface and a bottom surface, and at least one of the surfaces has a first microstructure constituted by the repeated undulation corresponding to the rolling wheel. Therefore, the paths of the light beams after entering the diffusion plate are changed, which raises the luminance of the backlight module that comprises the diffusion plate.

Take a method for making the diffusion plate 20 of the first embodiment in FIG. 2 for example. The material in step S61 is a body material. Then, step S62 is to provide an upper rolling wheel and a lower wheel, wherein the upper rolling wheel has a plurality of triangular extrusions corresponding to the second microstructure 29 on the surface thereof so as to form the prism structure of the second microstructure 29, and the lower rolling wheel has a plurality of circular extrusions corresponding to the first microstructure 28 on the surface thereof so as to form the circular grooves of the first microstructure 28. Finally, step S63 is to utilize the upper rolling wheel and the lower wheel to roll the body material to form the diffusion plate 20.

Take a method for making the diffusion plate 30 of the second embodiment in FIG. 3 for example. The material in step S61 comprises a body material and an upper layer material, wherein the body material has a first refractive index $n_1$, the upper layer material has a fourth refractive index $n_4$, and the first refractive index $n_1$ is larger than the fourth refractive index $n_4$. Preferably, the upper layer material is a transparent curable, or thermal curable resin. Then, step S62 is to provide an upper rolling wheel and a lower wheel, wherein the upper rolling wheel has a plurality of triangular extrusions corresponding to the second microstructure 35 on the surface thereof so as to form the prism structure of the second microstructure 35, and the lower rolling wheel has a plurality of circular extrusions corresponding to the first microstructure 34 on the surface thereof so as to form the circular grooves of the first microstructure 34. Then, in step S63, the body material is disposed under the upper layer material, or the upper layer material is coated on the top surface of the body material. The diffusion plate 30 is formed by a corolling process utilizing the upper rolling wheel and the lower wheel. Finally, the diffusion plate 30 is cured by heat or UV light, wherein the body material forms the body 31, and the upper layer material forms the upper layer 32.

Take a method for making the diffusion plate 40 of the third embodiment in FIG. 4 for example. The material in step S61 comprises a body material and a lower layer material, wherein the body material has a first refractive index $n_1$, the lower layer material has a third refractive index $n_3$, and the first refractive index $n_1$ is larger than the third refractive index $n_3$. Preferably, the lower layer material is a transparent curable or thermal curable resin. Then, step S62 is to provide an upper rolling wheel and a lower wheel, wherein the upper rolling wheel has a plurality of triangular extrusions corresponding to the second microstructure 45 on the surface thereof so as to form the prism structure of the second microstructure 45, and the lower rolling wheel has a plurality of circular extrusions corresponding to the first microstructure 44 on the surface thereof so as to form the circular grooves of the first microstructure 44. Then, in step S63, the body material is disposed over the lower layer material, or the lower layer material is coated on the bottom surface of the body material. The diffusion plate 40 is formed by a corolling process utilizing the upper rolling wheel and the lower wheel. Finally, the diffusion plate 40 is cured by heat or UV light, wherein the body material forms the body 41, and the lower layer material forms the lower layer 42.

Take a method for making the diffusion plate 50 of the fourth embodiment in FIG. 5 for example. The material in step S61 comprises a body material, an upper material and a lower layer material, wherein the body material has a first refractive index $n_1$, the upper layer material has a fourth refractive index $n_4$, the lower layer material has a third refractive index $n_3$, and the first refractive index $n_1$ is larger than the third refractive index $n_3$ and the fourth refractive index $n_4$. Preferably, the lower layer material and upper layer material are transparent curable or thermal curable resin. Then, step S62 is to provide an upper rolling wheel and a lower wheel, wherein the upper rolling wheel has a plurality of triangular extrusions corresponding to the second microstructure 56 on the surface thereof so as to form the prism structure of the second microstructure 56, and the lower rolling wheel has a plurality of circular extrusions corresponding to the first microstructure 55 on the surface thereof so as to form the circular grooves of the first microstructure 55. Then, in step S63, the body material is disposed over the lower layer material, and the upper layer material is disposed over the body material, or the lower layer material is coated on the bottom surface of the body material and the upper layer material is coated on the top surface of the body material. The diffusion plate 50 is formed by a corolling process utilizing the upper rolling wheel and the lower wheel. Finally, the diffusion plate 50 is cured by heat or UV light, wherein the body material forms the body 51, the upper layer material forms the upper layer 54, and the lower layer material forms the lower layer 52.

While several embodiments of the present invention have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. A diffusion plate used in a direct-type backlight module, comprising:

a body having a top surface and a bottom surface, the body having a first refractive index;

a plurality of diffusion particles doped in the body for refracting and diffusing the light beams in the body, the diffusion particles having a second refractive index, and the first refractive index being different from the second refractive index;

an upper layer attached to the top surface of the body, the upper layer being a transparent material and having a top surface, wherein the upper layer has a second microstructure on the top surface thereof, the second microstructure is constituted by repeated undulation, the upper layer has a fourth refractive index, and the first refractive index is larger than the fourth refractive index; and a lower lever attached to the bottom surface of the body, the lower layer being a transparent material and having a bottom surface, wherein the lower layer has a first microstructure on the bottom surface thereof, and the first microstructure is constituted by repeated undulation, the lower layer has a third refractive index, and the first refractive index is larger than the third refractive index.

2. The diffusion plate according to claim 1 wherein the first microstructure is constituted by a plurality of parallel grooves or extrusions, and the shape of the grooves or extrusions is selected from the group consisting of circular, rectangular, trapezoidal and triangular shapes.

3. The diffusion plate according to claim 1 wherein the second microstructure is constituted by a plurality of parallel grooves or extrusions, and the shape of the grooves or extrusions is selected from the group consisting of circular, rectangular, trapezoidal and triangular shapes.

4. A direct-type backlight module comprising the diffusion plate according to claim 1.

5. A display device comprising the direct-type backlight module according to claim 4.

* * * * *